Feb. 18, 1941.　　　N. L. ETTEN　　　2,232,378
WRINGER
Filed Nov. 14, 1938　　　5 Sheets-Sheet 1

Inventor:
Nicholas L. Etten

Feb. 18, 1941.  N. L. ETTEN  2,232,378
WRINGER
Filed Nov. 14, 1938  5 Sheets-Sheet 2

Inventor:
Nicholas L. Etten
By Tefft & Tefft
Attys.

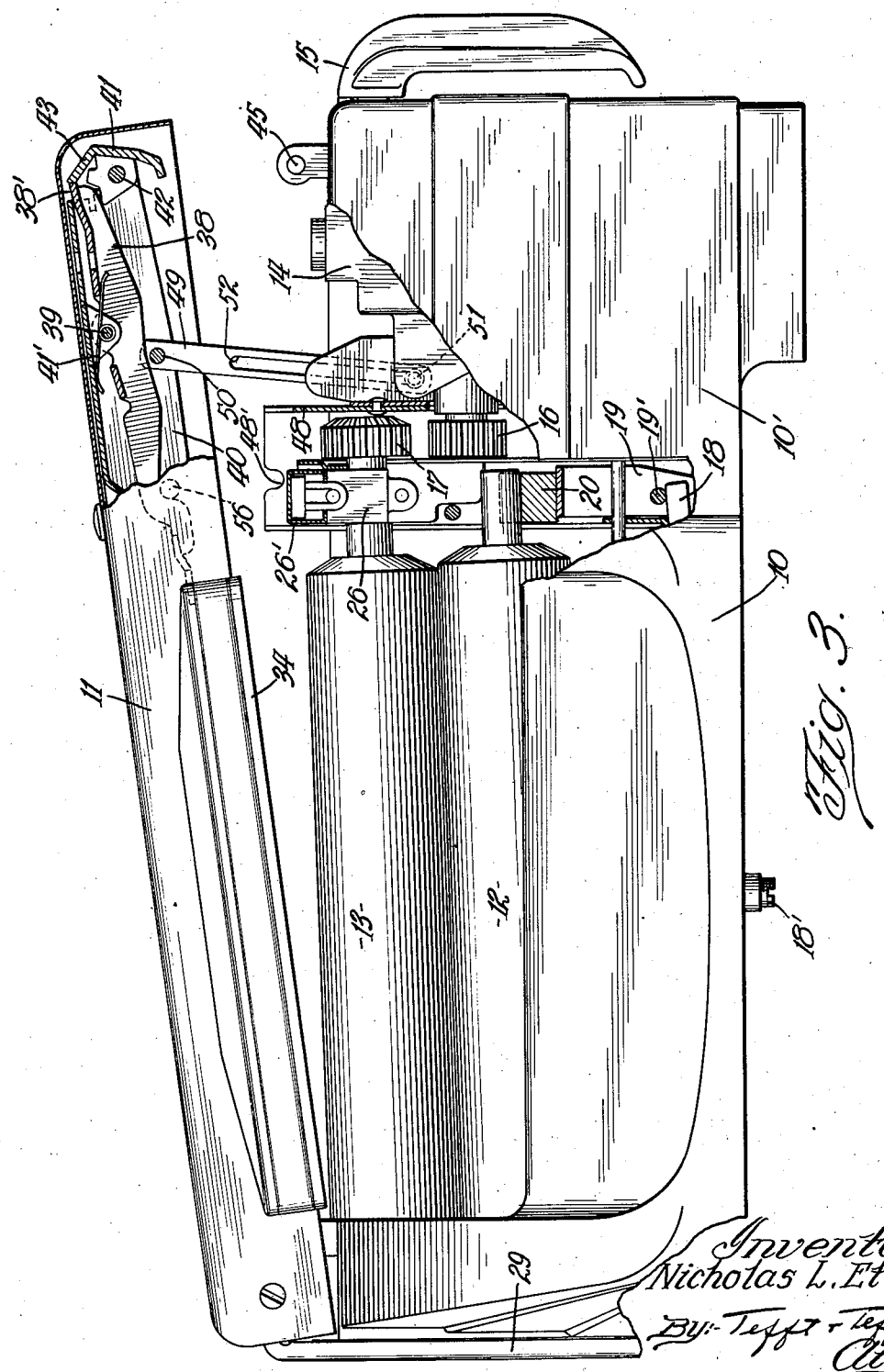

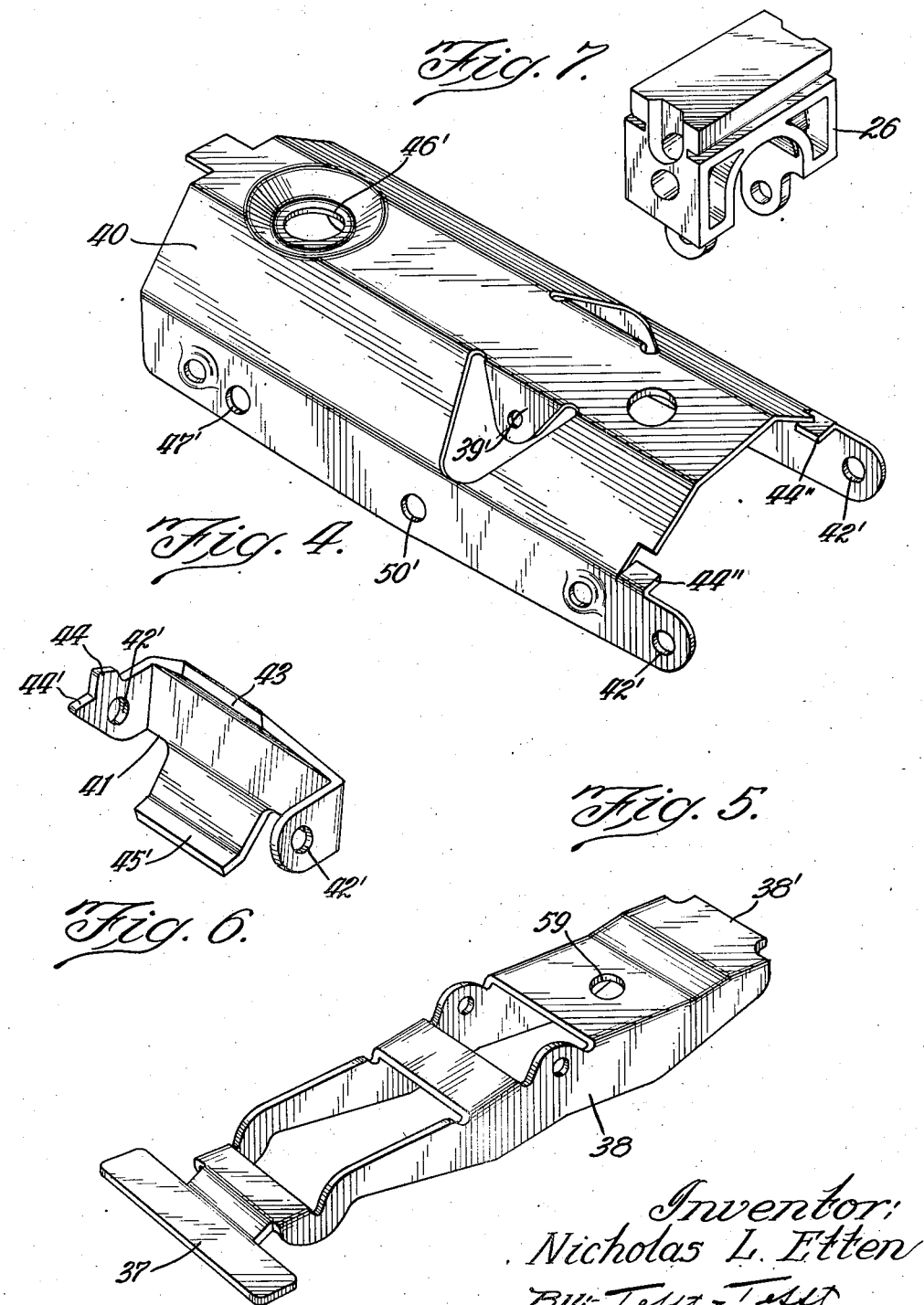

Feb. 18, 1941.   N. L. ETTEN   2,232,378
WRINGER
Filed Nov. 14, 1938   5 Sheets-Sheet 5

Inventor:
Nicholas L. Etten
By: Tefft & Tefft
Attys.

Patented Feb. 18, 1941

2,232,378

UNITED STATES PATENT OFFICE 2,232,378

WRINGER

Nicholas L. Etten, Waterloo, Iowa

Application November 14, 1938, Serial No. 240,266

7 Claims. (Cl. 68—263)

This invention refers to wringers and particularly to the type used on conventional electric washing machine. Improvements in the general design of washing machines have indicated the need for a more unified appearance to the wringer as well as the necessity for including on such modern wringers safety release devices, pressure reset mechanisms and a roll stop mechanism for stopping rotation of the rolls when the pressure is released.

The particular object of the invention is to provide a unified wringer and wringer head structure in which the wringer head or gear case for driving the wringer is enclosed completely within the lower frame and the top frame extends completely over the lower frame which, in this case, includes the conventional wringer head.

Another object is to provide in a wringer of modern design as above indicated, an effective pressure release and reset mechanism together with a simple and effective roll stop.

A still further object is to provide in a wringer as above described, a mechanism wherein the release device might be changed to another completely different looking device although utilizing in general most of the other parts of the wringer.

Other objects and benefits will be disclosed in the following descriptions and drawings in which:

Fig. 3 is a general elevation view of the wringer partly broken and partly in section with the head end of the upper frame released in upward position as it would appear shortly after roll pressure is released;

Fig. 4 is an enlarged isometric view of a sub-frame stamping for the upper frame to better show how the parts are mounted or assembled;

Fig. 5 is an enlarged isometric view of the trip lever employed in the release device;

Fig. 6 is an enlarged isometric view of the release device which holds the latch member of the upper frame on the lower frame;

Fig. 7 is an enlarged isometric view of an upper roll bearing bracket casting;

Figure 1:
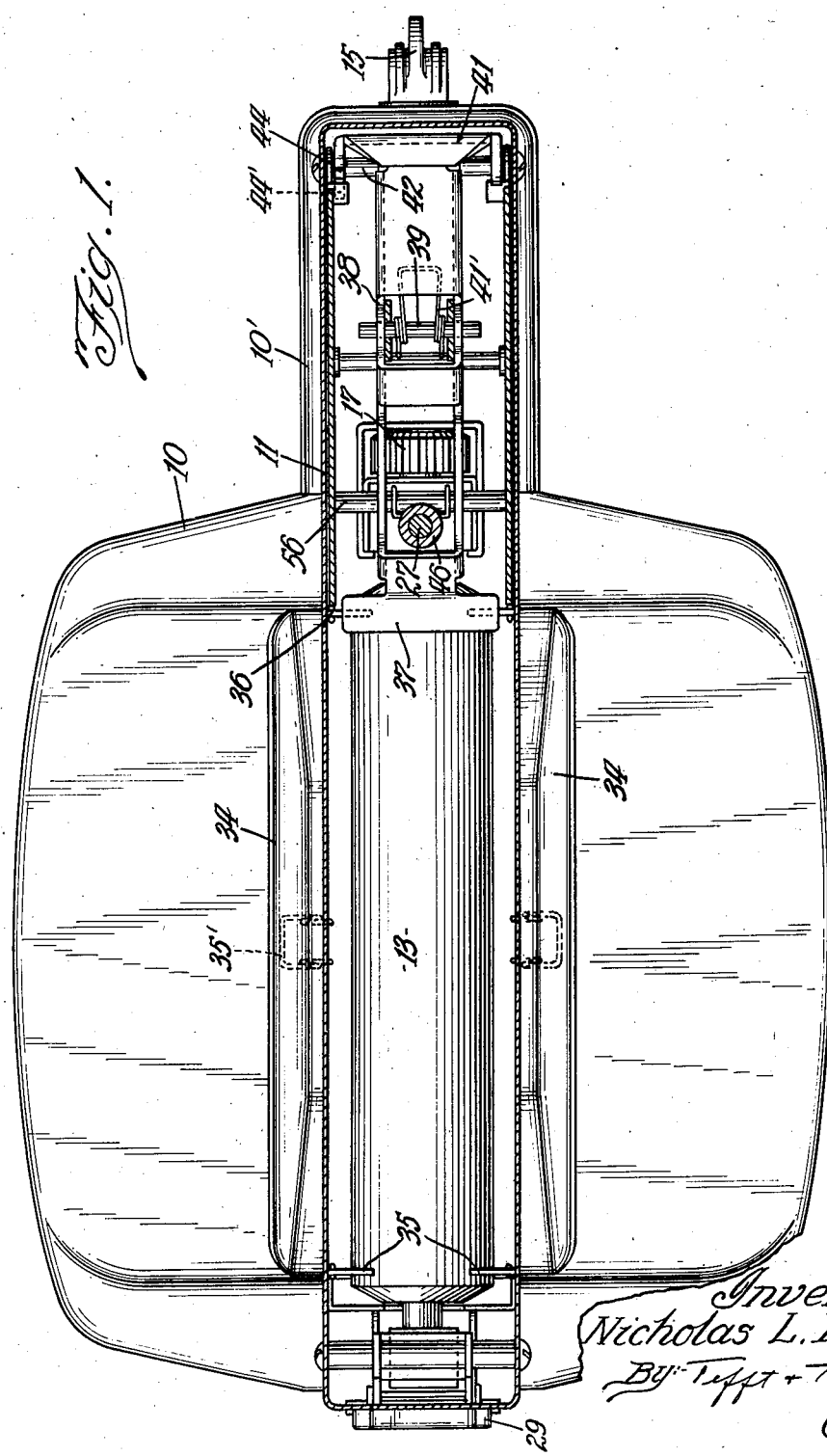
Fig. 1 is a sectional top plan view of the wringer as it appears on the section lines 1—1 of Fig. 2.
Figure 2:
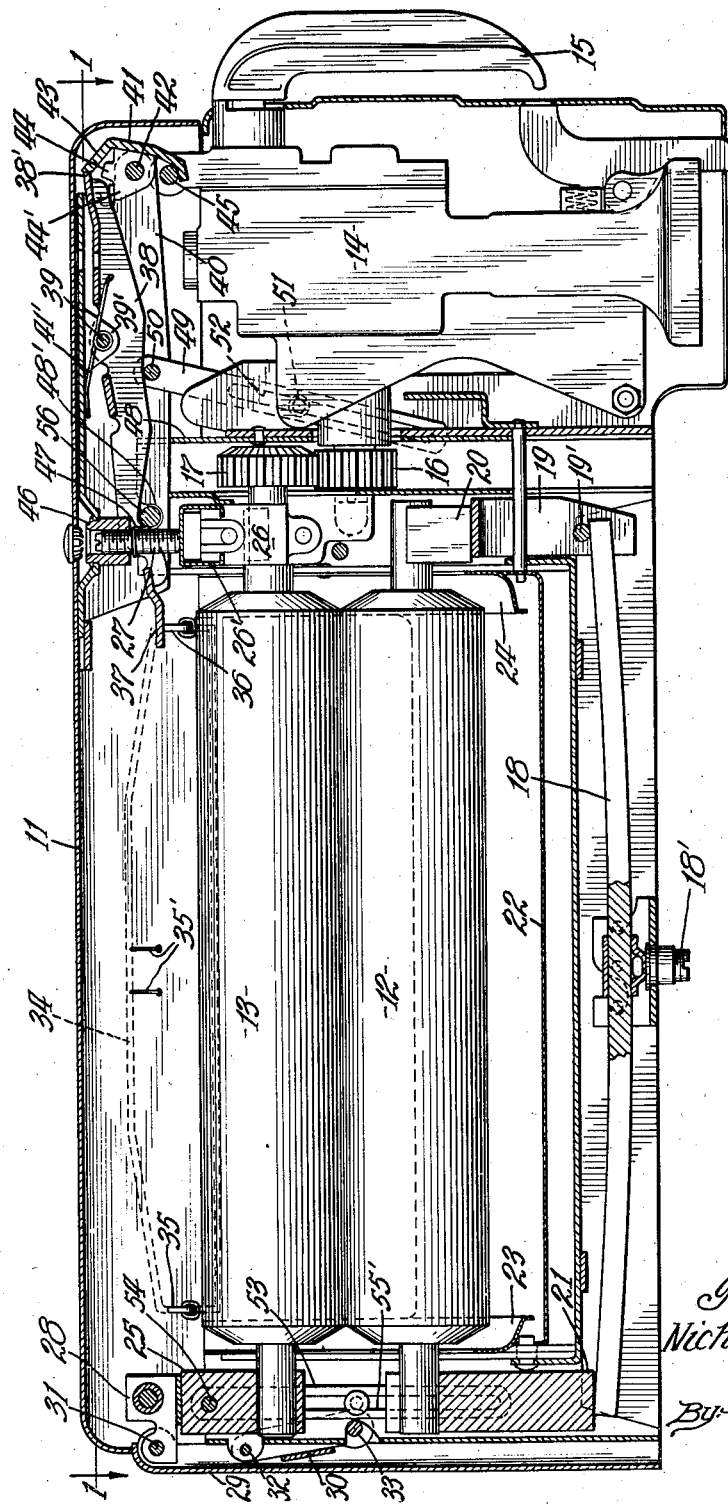
Fig. 2 is a general cross-sectional elevation view of the frames and other parts revealing the rolls, drive gears and wringer head in their proper relation to each other.

Now referring to the drawings and particularly to Figs. 1 and 2, I designate the lower frame generally by the numeral 10, and it will be noted that the drain boards are included. Integral with the frame 10 is a frame member 10' which surrounds and encloses the conventional wringer head.

The upper frame 11 is mounted on the lower frame 10, and it will be noted that unlike conventional designs, the upper frame 11 extends practically the full length of the wringer, including the section 10' of the lower frame enclosing the wringer head.

The lower roll is designated by the numeral 12 and the upper roll by the numeral 13. A conventional wringer head arranged to drive forward, reverse and neutral is designated by the numeral 14, and the control handle on this head by the numeral 15. This arrangement of wringer head and control handle is well known and will not be discussed in detail as it has no pertinency to this invention. Extending inwardly from the wringer head 14 is a spur gear 16 which meshes with a mating spur gear 17 affixed to the extension of the upper roll shaft 13. It will be apparent from this structure that in this arrangement the upper roll 13 is the drive roll and the lower roll 12 is the driven roll.

The lower roll 12 is urged upwardly by the leaf spring 18 adjustably supported at its center by the adjustment screw 18'. The inner end of the spring 18 supports a bearing bracket 19 from a cross pin 19', and the bearing bracket 19 supports a roll bearing 20 for the inner end of the upper roll 12. The outer end of the lower roll 12 is supported by conventional bearing 21.

A conventional flipper board 22 is mounted as shown, and it will be well understood that this flipper board is employed to divert the drain water from one side of the wringer to the other at the will of the operator. Conventional end shields 23 and 24 surround the ends of the wringer rolls and divert the water into the flipper board. This construction is conventional and will be well understood by persons skilled in the art.

The upper roll 13 is supported on its outer end by conventional roll bearing 25, but on its inner end it is supported by a metallic roll bearing bracket 26 to which is attached a stamping 26', which in turn abuts an adjustment screw 27. This structure is necessary in order to provide proper tooth contact between the spur gears 16 and 17. It will be apparent that for proper operation these gears must mesh accurately and by this structure is provided means whereby the accurate meshing of these gears may be obtained.

On the outer end of the upper frame 11 is a permanent pivot bracket 28 attached to the upper frame 11. To this pivot bracket is attached a conventional toggle lever reset mechanism consisting of the lever 29 and the toggle 30. This toggle lever mechanism is more or less conventional and will not be discussed in detail except to point out that the pivotal point 33 is slightly inward of the line of the pivot points 31 and 32 which provides a locked toggle lever which will hold the outer end of the frame 11 securely in place as long as these pivot points retain their locked position. However, as will later be explained, upon release of the release mechanism on the inner end, the pivot point 31 moves slightly outward and this has the effect of changing the pivot points to unlocked position, whereupon the outer end of the frame 11 may move upward.

Mounted on the sides of the upper frame 11 are push release bars 34. These bars are mounted with lever extensions 35 and 36 extending through the bottom of the upper frame and are sprung upward against the top frame 11 by torsion springs 35'. The inner end of the push bar levers 36 abut upwardly against the end of the latch release lever 38 on the shelf extension 37. By referring to Fig. 6, the structure of this latch release lever will be clearly understood. The lever is pivoted on the pivot pin 39 which is mounted in ears 39' of the sub-frame 40 which is clearly shown in Fig. 4. Around the pin 39 is a torsion spring 41' which urges the release lever 38 to counter-clockwise rotation around the pivot pin 39. On the end of the latch release lever 38 is a lip 38' which normally abuts against the upper edge of the latch 41, holding it in locked relation to the pin 45, permanently affixed in the wringer head, by means of the bent shoulder 45'.

By referring to Fig. 6, the construction of this latch will be well understood. The inwardly bent ears have holes 42' through which the pin 42 extends, and one of the ears has a boss 44 and a ledge 44' which cooperate with the pierced ear 44" in the sub-frame 40 to hold the latch in operative relationship with the release latch lever 38. The operation of this latch and release lever will be well understood when it is appreciated that when the safety release 34 is pressed downward, the fulcrum levers 36 abutting against the shelf end of the release lever 38 force this release lever into clockwise rotation. This depresses the lip 38' under the top edge of the latch 43 and permits the latch 41 to rotate counter-clockwise and thus releasing the shoulder 45' from under the pin 45, which releases the upper frame 11 on its inner end whereupon the spring 38 forces the rolls upward which permits the top frame 11 to take the position shown in Fig. 3.

By carefully considering Fig. 3, it will be appreciated that this movement results in rotation of the toggle lever pivot point inward which has the effect of unlocking the toggle whereupon the outer end of the frame may also move upward. This action is further assisted by the natural resultant shock and the combination of these two elements effectively results in the release of the outer end of the upper frame 11.

The upper frame 11 is prevented from separating from the lower frame by slotted straps 49 and 53, the strap 49 being fastened to the upper frame by the pin 50 and to the lower frame by the pin 51 thru the slotted opening 52. The outer straps 53 are attached by the pin 54 in the upper frame 11 and the pin 55 in the lower frame 10 through the slot 55'.

It will be appreciated that it is necessary to provide means whereby the spur gears 16 and 17 are held in proper mesh. This is done by means of the adjustment screw 27 in the boss 46 permanently riveted in the sub-frame 40 through the hole 46'. It will be appreciated that these gears may be moved apart by moving the screws upward and tighter mesh may be obtained by adjustment downward. The screw 27 is held in proper adjusted position by a friction spring 47 around the adjustment screw 27, as shown.

When the top frame is again assembled on the lower frame, proper alignment of the frames is assisted by the cross pin 56 entering into the slot 48' in the extension 48 of the lower frame. This will be well understood by referring to Fig. 3.

The wringer head 14 and the sub-frame 40 are mounted in a conventional manner in the lower frame 10 and the upper frame 11, respectively. The details of these mountings are clearly shown in the drawings and will not be described in detail.

From the foregoing description it will be well understood that a wringer head structure is provided which assembles the wringer and wringer head in a unified structure with the top frame extending practically over the entire device. This is a decided improvement in appearance over former structures wherein the wringer was a unit attached to a wringer head as a unit. Moreover, in a structure of this character there is provided an effective push bar safety release, a pressure reset mechanism and a roll stop.

Figure 8:
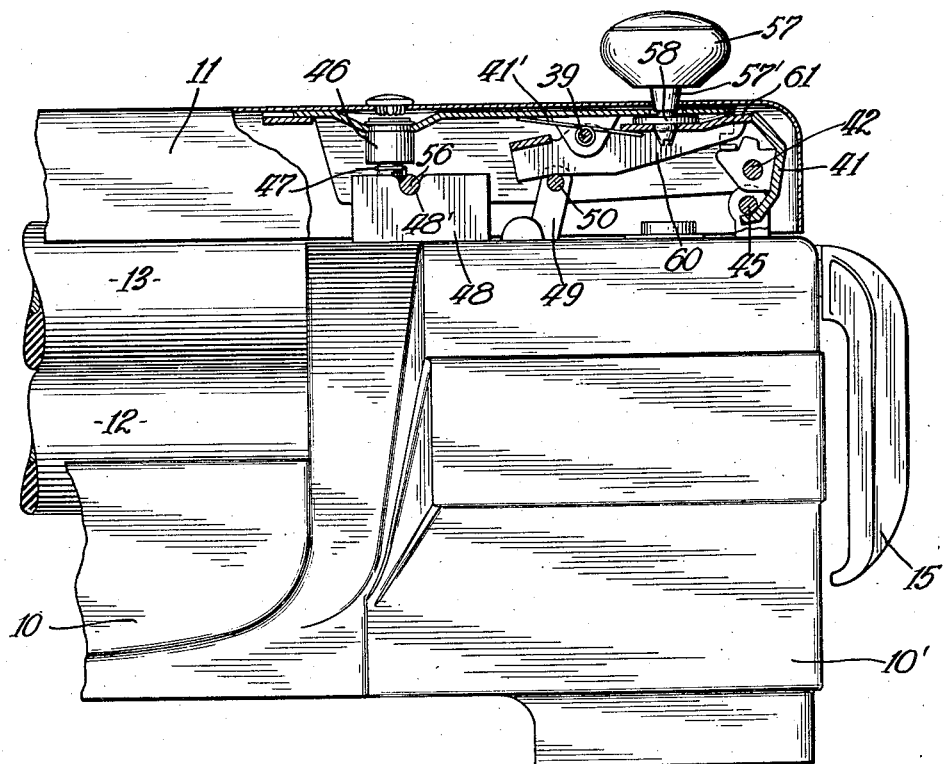
Fig. 8 is a partial broken elevation view of the head end of the wringer to show an optional arrangement of a release device.
Figure 9:
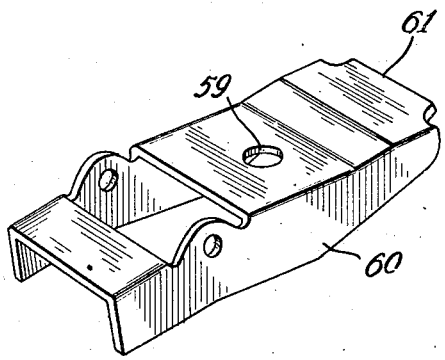
Fig. 9 is an enlarged isometric view of the trip lever employed in the optional arrangement of Fig. 8, showing clearly that it is the same trip lever as shown in Fig. 5 with one end cut off.

Now referring to Figs. 8 and 9, I show a modification wherein the safety release bars 34 are eliminated and in their stead on the head end of the wringer is mounted a safety bail 57 which has a stem 57' and a washer 58 which contacts the latch release lever 60 through the hole 59. By comparing Fig. 9 with Fig. 5, it will be readily appreciated that the release lever 60 is the same as release lever 38 except that the outer end has been cut off. It will be appreciated that any downward or tilting movement of the ball 56 will result in the washer 58 depressing the lip 61 and releasing the latch 41. Thus I provide a wringer made up of practically the same parts but of considerably different appearance because the release bars 34 have been omitted and the safety bail 56 added. The operation of the wringers is, of course, the same in both cases.

Having thus described my invention,
I claim:

1. In a roll wringing mechanism for power driven domestic washers, a lower frame, a pair of cooperative pressure rolls in the lower frame, a reversible gear head roll drive mechanism in the lower frame, spur gear drive means to the upper roll, an upper frame mounted on and covering the lower frame, an upper roll adjustment screw in the upper frame for adjusting the mesh of the spur drive gears, a toggle pressure reset mechanism connecting the outer ends of the frames, a release latch mechanism connecting the inner ends of the frames, and manually operable pressure release means mounted on the upper frame and co-acting with the release latch to release the upper frame and roll pressure.

2. In a roll wringing mechanism for power driven domestic washers, a lower frame, a pair of cooperative pressure rolls in the lower frame, a reversible gear head roll drive mechanism in the lower frame, spur gear drive means to the upper roll, an upper frame mounted on and covering the lower frame, an upper roll adjustment screw in the upper frame for adjusting the mesh of the spur drive gears, a toggle pressure reset mechanism connecting the outer ends of the frames, a release latch mechanism connecting the inner ends of the frames, and a pressure release knob co-acting with the release latch mechanism by any downward or pivotal movement to release roll pressure.

3. In a roll wringing mechanism for power driven domestic washers, a lower frame, a pair of cooperative pressure rolls in the lower frame, a reversible gear head roll drive mechanism in the lower frame, an upper frame mounted on and covering the lower frame, a toggle pressure reset mechanism connecting the outer ends of the frames, a release latch mechanism connecting the inner ends of the frames, slotted retaining straps connecting the ends of the frames, and manually operable pressure release levers mounted on the upper frame and co-acting with the release latch to release the upper frame and roll pressure.

4. In a roll wringing mechanism for power driven domestic washers, a lower frame, a pair of cooperative pressure rolls in the lower frame, a reversible gear head roll drive mechanism in the lower frame, an upper frame mounted on and covering the lower frame, a toggle pressure reset mechanism connecting the outer ends of the frames, a release latch mechanism connecting the inner ends of the frames, slotted retaining straps connecting the ends of the frames, and a pressure release knob co-acting with the release latch mechanism by any downward or pivotal movement to release roll pressure.

5. In a roll wringing mechanism for power driven domestic washers including a pair of cooperative pressure rolls, bearings for said rolls, and a pressure spring, the combination of a supporting frame comprising a pair of vertical bearing stiles and a longitudinal channel member interconnecting said stiles at their lower end, a power head including a reverse gearing, mounting means on said power head for the supporting frame, and additional frame structures comprising a cover extending around the supporting frame, the mounting means, and the power head to enclose and conceal said supporting frame, mounting means, and power head.

6. In a roll wringing mechanism for power driven domestic washers, including a pair of cooperative pressure rolls, bearings for said rolls, and a pressure spring, the combination of a supporting frame comprising a pair of vertical bearing stiles and a longitudinal channel member interconnecting said stiles at their lower end, a power head including a reverse gearing, mounting means on said power head for the supporting frame, additional frame structures comprising a cover extending around the supporting frame, the mounting means, and the power head to enclose and conceal said supporting frame, mounting means, and power head; a top frame coextensive with said cover, a release latch for the top frame, and a reset lever for said top frame.

7. In a roll wringing mechanism for power driven domestic washers, a pair of cooperative pressure rolls, bearings for said rolls, a supporting frame comprising a pair of vertical bearing stiles and a longitudinal channel member interconnecting said stiles at their lower end, a flat leaf pressure spring housed in said longitudinal frame channel member and interconnected with said bearings, a power head including a reverse gearing, mounting means on said power head for the supporting frame, additional frame structures comprising a cover extending around the supporting frame, the mounting means, and the power head to enclose and conceal said supporting frame, mounting means, and power head, a top frame coextensive with said cover, a release latch for the top frame, and a toggle link reset lever for said top frame.

NICHOLAS L. ETTEN.